H. GOLDMAN.
CALCULATING MACHINE.
APPLICATION FILED APR. 23, 1908.

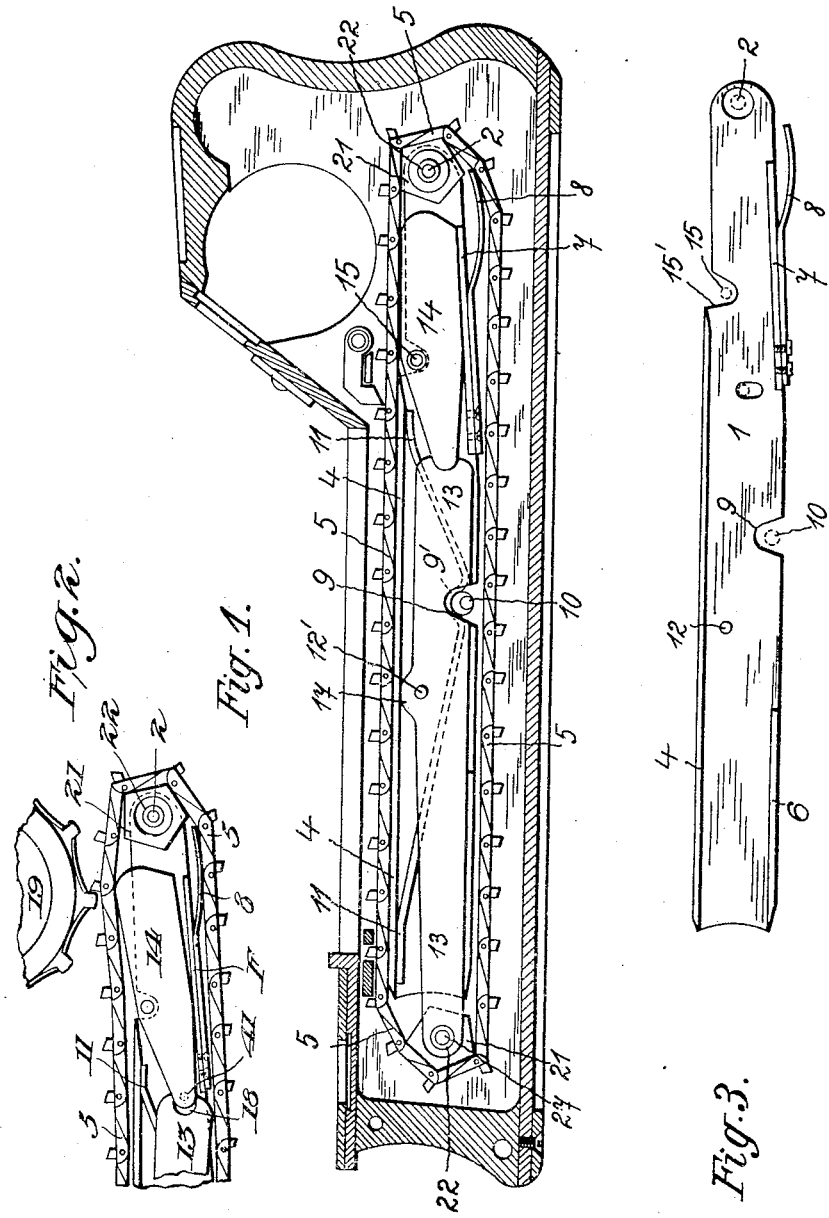

956,846.

Patented May 3, 1910.
2 SHEETS—SHEET 2.

INVENTOR,
HENRY GOLDMAN,
by
van Oldenueel & Schoenlank
Attorneys.

WITNESSES:

UNITED STATES PATENT OFFICE.

HENRY GOLDMAN, OF BERLIN-FRIEDENAU, GERMANY.

CALCULATING-MACHINE.

956,846.  Specification of Letters Patent.  Patented May 3, 1910.

Application filed April 23, 1908. Serial No. 428,772.

*To all whom it may concern:*

Be it known that I, HENRY GOLDMAN, merchant, a citizen of the United States of America, residing at Berlin-Friedenau, 6 Brunhildstrasse, in the Kingdom of Prussia, German Empire, have invented a new and useful Improvement in Calculating-Machines; and I do hereby declare the following to be a full, clear, and exact description of the same.

This invention relates to calculating devices, especially to adding machines, and the object thereof is to provide a simple and highly-efficient form of machine.

Figure 4:
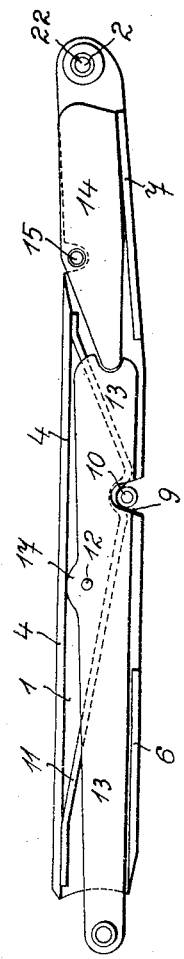
Figure 5:
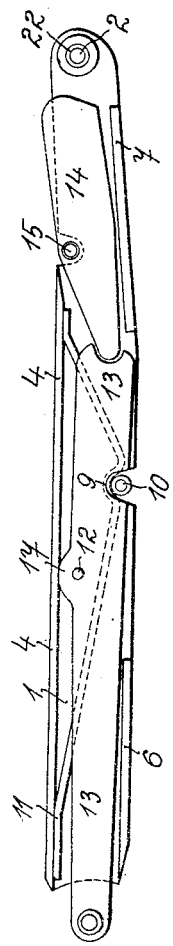
Figure 6:
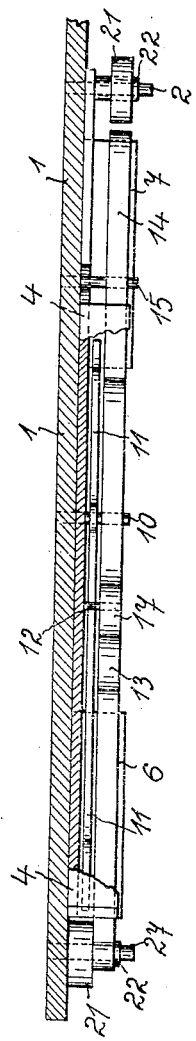

Referring to the accompanying drawings, Figure 1 indicates a longitudinal section through a machine embodying my improvements, the indicating and restoring mechanism being omitted; Fig. 2 is a fragment of part of Fig. 1, showing also a counting-wheel and the chain shifted into driving connection therewith; Fig. 3 is a side view of a main lever; Fig. 4 is a like view, showing the addition of the chain-shift lever and the supplementary lever operating the same; Fig. 5 is a view similar to Fig. 4, showing a different position of the chain-shift lever and supplementary lever; and Fig. 6 is a top view of the features of Fig. 4 and partly broken away.

The form of machine shown in the drawings is one intended to be operated by a lead pencil or other means (for solving problems in addition).

The machine may be provided with as many counting-wheels, as desired, and each counting-wheel is operated by an endless chain 5 (when the latter is shifted), which passes lengthwise around and above and below a main lever 1 (one for each chain) the front end of which is depressible while its rear end is pivoted upon a tube 22 which surrounds a pin 2. The chain 5 passes over a rear wheel 21 (also rotatable about the tube 22), and also passes over a forward wheel, 21, rotatable about a tube 22 around a pin 27 (Figs. 1 and 6).

Each main lever has a top flange 4 (Fig. 3) and bottom flanges 6 and 7, and there is a spring 8 secured to the last-mentioned flange, in order normally (as in Fig. 1) to keep the upper face of the chain taut or flat. The top flange furnishes a bearing for the chain, while the flanges 6 and 7 not only furnish additional bearings for the chain but also support and house the levers 13 and 14.

Each lever is nicked, at 15′ (Fig. 3), along its upper edge, so as not to interfere with an axle-pin 15, and also nicked, at 9, along its bottom edge, so as not to interfere with a stop-pin 10. A spring 11 is formed, to permanently rest at its bent part upon said pin 10, and has both of its ends pressing upwardly against the flange 4. As a result, the main-lever 1 is normally held in its raised position—that shown in Figs. 1 and 4.

A chain-shift lever, 14, is pivoted, about midway of its length, upon the pin 15 (Fig. 4), and its forward reduced end fits within the forked rear end of a supplementary lever 13. The latter is pivoted, at its forward end, upon the tube which surrounds the pin 27. Such lever 13 may have an opening, 12′, to be fitted by a pin 12 projecting from the lever 1, and the supplementary lever 13 may also have a swell, 17, against which the flange 4 rests.

The normal position of the described parts is that shown in Figs. 1 and 4, the main lever 1 being raised by spring 11, the supplemental lever being raised (upon its forward pivoted end) by engagement with the pin 12, the chain-shift lever having its rear end lowered, and the chain 5 held flat, along its upper face, by the spring 8. In such position, the chain does not engage its counting-wheel, so that the latter may easily be restored to zero.

To cause a chain to operate its wheel, it is necessary only for the user to insert a pencil between links of the upper face of the chain, and to depress the main-lever 1; thereupon the lever 13 is depressed and raises the chain-shift lever (see Fig. 5) so as to have the rear end of the latter lift the chain (as shown in Fig. 2), against the pull of the spring 8, and into position to engage the teeth of and drive a counting-wheel 19. The extent of movement of a counting-wheel depends upon the amount of pull given the corresponding chain 5.

To permit return of the chain to its normal position (free of its counting-wheel), it is necessary only to lift the pencil, whereupon the spring raises the lever 1, and the lever 13 is also raised and the chain-shift lever 14 is lowered, permitting spring 8 to tighten the chain.

The counting wheels 19, one for each chain, may be mounted for operation, in any desired manner.

What I claim is:—

1. In a calculating machine, the combination with a counting wheel, of a chain for driving said counting-wheel and normally disconnected therefrom, and of means for temporarily moving the chain into engagement with the wheel, said means comprising a main lever, a supplementary lever operable by the main lever, and a chain-shift lever carried by the main lever and engaged by the supplementary lever.

2. In a calculating machine, means for operating a counting-wheel, and comprising a main lever pivoted at its rear end, a supplementary lever pivoted at its forward end and engaging with the main lever, a chain-shift lever pivotally carried by the main lever and engaged by the supplementary lever, and an endless chain surrounding the parts mentioned and in position to be moved by the chain-shift lever.

In testimony whereof, I have signed my name to this specification in the presence of two subscribing witnesses.

HENRY GOLDMAN.

Witnesses:
HENRY HASPER,
WOLDEMAR HAUPT.